United States Patent
Ghosh et al.

(10) Patent No.: US 9,667,132 B2
(45) Date of Patent: May 30, 2017

(54) FLYBACK CONVERTER

(71) Applicant: SCHNEIDER ELECTRIC IT CORPORATION, West Kingston, RI (US)

(72) Inventors: Rajesh Ghosh, Bangalore (IN); Raju Narasimha, Bangalore (IN); Mahendrakumar H. Lipare, Bangalore (IN); Damir Klikic, Waltham, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 5 days.

(21) Appl. No.: 14/764,321

(22) PCT Filed: Jan. 30, 2013

(86) PCT No.: PCT/US2013/023855
§ 371 (c)(1),
(2) Date: Jul. 29, 2015

(87) PCT Pub. No.: WO2014/120153
PCT Pub. Date: Aug. 7, 2014

(65) Prior Publication Data
US 2015/0381031 A1  Dec. 31, 2015

(51) Int. Cl.
*H02M 1/34* (2007.01)
*H02M 3/335* (2006.01)

(52) U.S. Cl.
CPC ......... *H02M 1/34* (2013.01); *H02M 3/33507* (2013.01); *H02M 3/33569* (2013.01); *H02M 2001/342* (2013.01); *Y02B 70/1491* (2013.01)

(58) Field of Classification Search
CPC .... H02M 3/34; H02M 3/335; H02M 3/33515; H02M 3/33523; H02M 3/3353;
(Continued)

(56) References Cited

U.S. PATENT DOCUMENTS 5,377,091 A    12/1994  Faulk
6,094,366 A *  7/2000  Kalfhaus ............. H02M 1/4258
                                                363/73
(Continued)

OTHER PUBLICATIONS

Extended European Search Report from corresponding European Application No. 13874032.9 dated Aug. 25, 2016.
(Continued)

*Primary Examiner* — Emily P Pham
*Assistant Examiner* — Shahzeb K Ahmad
(74) *Attorney, Agent, or Firm* — Lando & Anastasi, LLP

(57) ABSTRACT

According to one aspect, embodiments herein provide a flyback converter comprising an input, an output, a rectifier, a transformer having a primary winding and a secondary winding, a switch, the switch being closed in a first mode of operation and open in a second and third mode of operation, and a regenerative snubber circuit, wherein the flyback converter is configured such that in the first mode of operation, the DC power from the rectifier charges the transformer, wherein the flyback converter is configured such that, in the second mode of operation, the snubber circuit is configured to store leakage energy from the primary winding, and wherein the flyback converter is configured such that, in the third mode of operation, the snubber circuit is configured to provide the stored energy to the primary winding. The flyback converter may also have high power factor at the input while operating from AC input.

17 Claims, 6 Drawing Sheets

(58) Field of Classification Search
CPC ......... H02M 3/33538; H02M 3/33507; H02M 3/33569; H02M 2001/342; H02M 7/02; H02M 7/12; H02M 7/125; H02M 7/155; H02M 7/21; H02M 7/217; H02M 2001/0048; H02M 2001/344; H02M 2001/346; H02M 2001/348; Y02B 70/1491

See application file for complete search history.

(56) References Cited

U.S. PATENT DOCUMENTS

| | | | |
|---|---|---|---|
| 6,473,318 B1 | 10/2002 | Qian et al. | |
| 8,488,343 B2* | 7/2013 | Hong | H02M 3/33569 363/21.18 |
| 2003/0034765 A1* | 2/2003 | Yang | H02M 1/40 323/284 |
| 2004/0114401 A1* | 6/2004 | De Anna | H02M 1/34 363/56.12 |
| 2005/0180179 A1 | 8/2005 | Hirst | |
| 2006/0104097 A1* | 5/2006 | Tsuruya | H02M 1/16 363/55 |
| 2006/0209581 A1 | 9/2006 | Choi et al. | |
| 2011/0194313 A1 | 8/2011 | Yoshinaga | |
| 2011/0305048 A1 | 12/2011 | Yang et al. | |
| 2014/0043863 A1* | 2/2014 | Telefus | H02M 3/33592 363/17 |

OTHER PUBLICATIONS

Notification of Transmittal of the International Search Report and the Written Opinion of the International Searching Authority from corresponding PCT/US2013/023855 dated Apr. 5, 2013.

Toh et al. High-Frequency Transformer-Link Inverter with Regenerative Snubber Power Electronics and Drives Group, Department of Energy Conversion, Faculty of Electrical Engineering, Universiti Teknologi Malaysia, 81310 UTM Skudai, Johor, Malaysia. 2005 IEEE. [retrieved on Mar. 13, 2013]. Retrieved from the Internet: <URL:http://eprints.utm.my/1649/1/zainalsalam05_high_freq.pdf>. pp. 642-647.

* cited by examiner

FLYBACK CONVERTER

CROSS-REFERENCE TO RELATED APPLICATIONS

This application is a U.S. National Stage Application under 35 U.S.C. §371 of International Application No. PCT/US2013/023855, filed Jan. 30, 2013, which is hereby incorporated herein by reference in its entirety.

BACKGROUND OF INVENTION

1. Field of Invention

The present invention relates generally to high-efficiency flyback converters.

2. Discussion of Related Art

Flyback converters are commonly used as isolated battery chargers and/or front-end AC-DC and DC-DC converters in switch mode power supply applications. Typical flyback converters provide galvanic isolation between the input and the output of the converter. For example, a common flyback converter is a buck-boost converter including an inductor which is split to form a transformer. A primary winding of the transformer is coupled to the input and a secondary winding of the transformer is coupled to the output, providing isolation between the input and the output.

SUMMARY OF INVENTION

At least one aspect of the invention is directed to a flyback converter, the flyback converter comprising an input to receive input AC power, an output to provide output DC power, a rectifier coupled to the input and configured to convert the input AC power into DC power, a transformer having a primary winding and a secondary winding, the primary winding having a first end coupled to the rectifier, a switch coupled between a second end of the primary winding and a ground connection, the switch being closed in a first mode of operation and open in a second and third mode of operation, and a regenerative snubber circuit coupled between the first end of the primary winding and the second end of the primary winding, wherein the flyback converter is configured such that in the first mode of operation, the DC power from the rectifier charges the transformer, wherein the flyback converter is configured such that, in the second mode of operation, the regenerative snubber circuit is configured to store leakage energy from the primary winding, and wherein the flyback converter is configured such that, in the third mode of operation, the regenerative snubber circuit is configured to provide the stored leakage energy to the primary winding.

According to one embodiment, the switch is a MOSFET having a drain coupled to the second end of the primary winding and a source coupled to the ground connection.

According to another embodiment, the primary winding and the secondary winding have opposite polarities. In one embodiment, the flyback converter further comprises an output diode coupled between the secondary winding and the output, and an output capacitor coupled to the output and configured to be coupled to a load, wherein the flyback converter is configured such that, in the second mode of operation, the secondary winding provides the output DC power to the capacitor and to the output via the output diode, and wherein the flyback converter is configured such that, in the first mode of operation, the output capacitor provides the output DC power to the output. In another embodiment, the flyback converter further comprises a filter coupled between the rectifier and the first end of the primary winding.

According to one embodiment, the regenerative snubber circuit comprises a snubber diode, a snubber capacitor, wherein the snubber diode and the snubber capacitor are coupled in series between the first end and the second end of the primary winding, and a snubber switch coupled between the snubber capacitor and the second end of the primary winding, wherein the flyback converter is configured such that, in the second mode of operation, the snubber switch is open and leakage energy from the primary winding charges the snubber capacitor via the snubber diode, and wherein the flyback converter is configured such that, in the third mode of operation, the snubber switch is closed and the snubber capacitor discharges stored leakage current to the second end of the primary winding via the snubber switch. In one embodiment, the snubber switch is a FET having a drain coupled to the snubber capacitor and a source coupled to the second end of the primary winding.

According to another embodiment, the flyback converter further comprises a resistor coupled between the drain of the FET and the second end of the primary winding. In another embodiment, the flyback converter further comprises a controller coupled to the switch and to the regenerative snubber, the controller configured to operate the switch to provide desired DC power and to operate the regenerative snubber circuit to recover leakage energy from the primary winding while the switch is open.

According to one embodiment, the flyback converter further comprises a reference current generation circuit coupled to the output and to the primary winding, the reference current generation circuit configured to generate a reference current signal based on the output DC power and the DC power from the rectifier, wherein the controller is further configured to operate the switch and the regenerative snubber circuit based on the reference current signal. In one embodiment, the controller is configured to implement peak current mode control based on the reference current signal. In another embodiment, the reference generation circuit includes a multiplier, and wherein the reference generation circuit is further configured to generate the reference current signal by multiplying a signal related to a voltage at the first end of the primary winding with a signal related to a voltage at the output. In one embodiment, the multiplier is implemented using sine-triangle comparison by a comparator.

Another aspect of the invention is directed to a method for operating a flyback converter, the method comprising receiving input AC power at an input of the flyback converter, providing output DC power to an output of the flyback converter, converting the input AC power into DC power, in a first mode of operation of the flyback converter, charging a transformer with the DC power, in a second mode of operation of the flyback converter, discharging the transformer to provide the output DC power to the output, and storing, with a regenerative snubber circuit, leakage energy from the transformer, and in a third mode of operation of the flyback converter, providing, with the regenerative snubber circuit, previously stored leakage energy to the transformer.

According to one embodiment, the method further comprises in the first mode of operation, discharging an output capacitor to provide the output DC power to the output, and in the second mode of operation, charging the output capacitor with energy from the transformer.

According to another embodiment, storing includes storing leakage energy from the transformer in a snubber capacitor. In one embodiment, providing stored leakage energy includes coupling the snubber capacitor to the transformer, and discharging the snubber capacitor to provide stored leakage energy to the transformer.

According to one embodiment, the method further comprises sensing that the flyback converter is no longer in the first mode of operation, and controlling the flyback converter to enter the second mode of operation after a predetermined delay.

One aspect of the invention is directed to a flyback converter, the flyback converter comprising an input to receive input AC power, an output to provide output DC power and configured to be coupled to a load, a rectifier coupled to the input and configured to convert the input AC power into DC power, a transformer having a primary winding and a secondary winding, the primary winding having a first end coupled to the rectifier, a switch coupled between a second end of the primary winding and a ground connection, the switch being closed in a first mode of operation and open in a second and third mode of operation, and means for recovering, in the second mode of operation, leakage energy from the primary winding of the transformer and providing, in the third mode of operation, the recovered leakage energy to the load.

In one embodiment, the flyback converter further comprises means for preventing the means for recovering leakage energy from interfering with operation of the flyback converter in the first mode of operation.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
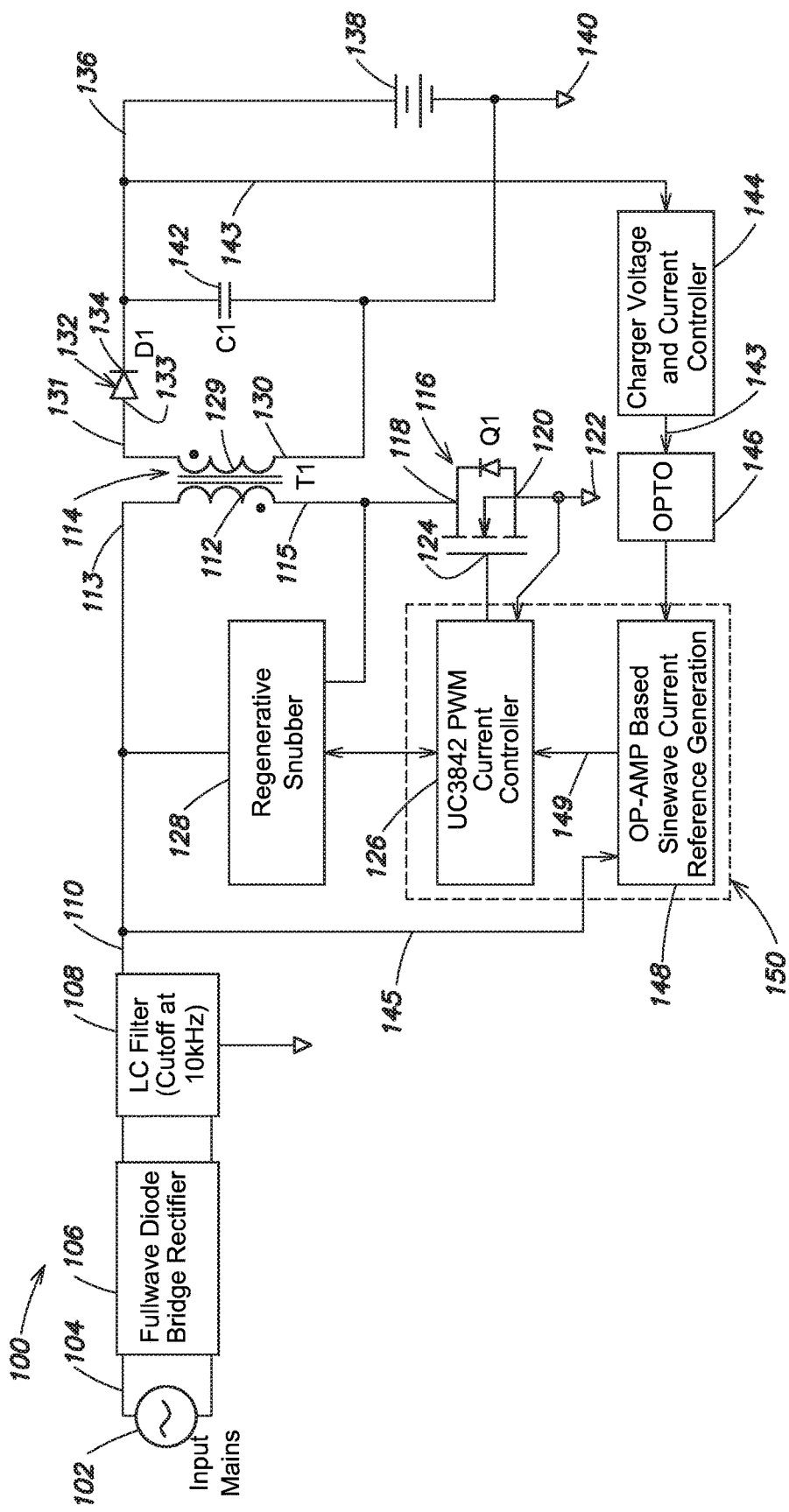
FIG. 1 is a schematic diagram of a single-switch flyback converter according to aspects of the current invention.

Various embodiments and aspects thereof will now be discussed in detail with reference to the accompanying drawings. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, a typical flyback converter includes a transformer coupled between the input and the output of the converter to provide isolation. Common flyback converters also may include a single switch coupled to the transformer to control a charging operation of the flyback converter. Such single-switch flyback converters are typically utilized up to a power level of 300 W. However, at power levels higher than about 300 W, it typically becomes difficult to control energy associated with leakage inductance of the transformer within a single-switch flyback converter. Transformer leakage inductance may manifest itself as increased voltage stress across the single switch.

Prior approaches for controlling the effect of transformer leakage inductance within a single-switch flyback converter apply costly high-wattage dissipative (resistive) snubbers. However, dissipative snubbers reduce the converter efficiency and also may require improved thermal management.

Embodiments described herein provide a single-switch flyback converter with a regenerative snubber. According to some embodiments, the flyback converter with regenerative snubber is utilized with power levels beyond 600 W and provides a power conversion efficiency of greater than 92%.

FIG. 1 is a block diagram of a single-switch AC-DC flyback converter 100 according to aspects described herein. According to one embodiment, the flyback converter 100 is a single-stage AC-DC converter based battery charger. The converter 100 includes an input 104, a rectifier 106, a filter 108, a transformer 114 including a primary winding 112 and a secondary winding 129, a switch 116, a regenerative snubber circuit 128, a voltage and output current controller 144, an optocoupler 146, converter control circuitry 150, an output diode 132, an output capacitor 142, and an output 136. In one embodiment, the converter control circuitry 150 includes a Pulse Width Modulation (PWM) current controller 126 and a sine wave current reference generation circuit 148.

The input 104 is configured to be coupled to an input AC mains power source 102. The input 104 is also coupled to the rectifier 106. The rectifier 106 is coupled to the filter 108. An output 110 of the filter 108 is coupled to a first end 113 of the primary winding 112 of the transformer 114. A second end 115 of the primary winding 112 of the transformer 114 is coupled to the switch 116. According to one embodiment, the switch 116 is a Metal Oxide Semiconductor Field-Effect Transistor (MOSFET); however, in other embodiments, a different type of switch may be used. The second end 115 of the primary winding 112 of the transformer 114 is coupled to the drain 118 of the MOSFET 116. The source 120 of the MOSFET 116 is coupled to ground 122. The gate 124 of the MOSFET 116 is coupled to the PWM current controller 126. The regenerative snubber 128 is coupled between the first end 113 of the primary winding 112 of the transformer 114 and the second end 115 of the primary winding 112 of the transformer 114. The PWM current controller 126 is also coupled to the regenerative snubber and to the source 120 of the MOSFET 116.

A first end 131 of the secondary winding 129 of the transformer 114 is coupled to an anode 133 of the output diode 132. The cathode 134 of the output diode 132 is coupled to an output 136 of the converter 100. The output 136 is configured to be coupled to a load 138. According to one embodiment, the load 138 is a DC power source, such as a battery; however, in other embodiments, the output 136 may be coupled to a different type of load. A second end 130 of the secondary winding 129 of the transformer 114 is coupled to ground 140. The output capacitor 142 is coupled between the output 136 of the converter 100 and ground 140.

The voltage and output current controller 144 is coupled to the output 136 of the converter 100. The optocoupler 146 is coupled between the voltage and output current controller 144 and the sine wave current reference generation circuit 148. The sine wave current reference generation circuit 148 is also coupled to the PWM current controller 126 and to the output 110 of the filter 108.

In a first mode of operation of the converter 100, the switch 116 is closed and the input 104 of the converter 100 receives input AC power from the AC power source 102. The rectifier 106 converts the AC power into DC power. According to one embodiment, the rectifier 106 is a full-wave diode bridge rectifier; however, in other embodiments a different type of rectifier may be used. The DC power is filtered by the filter 108 and the filtered DC power is provided to the primary winding 112 of the transformer 114. According to one embodiment, the filter 108 is an LC filter with a cutoff at 10 kHz; however, in other embodiments, another appropriate filter or different cutoff frequency may be utilized. According to one embodiment, the turns ratio of the transformer 114 is 1:1; however, in other embodiments, the turns ratio of the transformer 114 may be configured differently.

As the filtered DC power is provided to the primary winding 112, current passes from the first end 113 to the second end 115, and the current and magnetic flux in the primary winding increases, resulting in energy being stored in the transformer 114. According to one embodiment, the primary winding 112 and the secondary winding 129 have opposite polarities. Therefore, as the current and magnetic flux in the primary winding increases, the resulting voltage induced in the secondary winding is negative. As a result, the output diode 132 is reverse-biased, preventing current through the output diode 132. Also in the first mode of operation, the output capacitor 142 supplies previously stored energy to the output 136.

In a second mode of operation, the switch 116 is opened and voltage across the switch 116 increases. Once the voltage across the switch 116 reaches a threshold level, the output diode 132 becomes forward biased, allowing current to pass from the secondary winding 129 to the output 136 and the output capacitor 142 via the output diode 132. Energy previously stored in the transformer 114 during the first mode of operation is supplied to the output 136 and also charges the output capacitor 142.

In the second mode of operation, the snubber circuit 128 is turned on to recover energy associated with leakage inductance current in the primary winding 112, and a portion of the magnetizing energy in the primary winding 112. The recovered energy is fed back to the load to improve efficiency of the converter 100. Operation of the snubber circuit 128 is discussed in greater detail below.

The converter 100 is controlled to provide desired power to the load 138 and to prevent the regenerative snubber circuit 128 from interfering with operation of the converter 100 in the first mode of operation. For example, in one embodiment, the regenerative snubber 128 is prevented from being turned on at the same time the switch 116 is closed.

The voltage and output current controller 144 monitors signals at the output 136 of the converter 100 and controls the voltage and output current being provided to the load 138. For example, in one embodiment, where the load is a battery 138, the voltage and output current controller 144 controls the voltage and current being supplied to the battery 138 to charge the battery 138.

Based on the signals monitored at the output 136, the charger voltage and current controller 144 provides a signal to the sine wave current reference generation circuit 148 to control the sine wave current reference signal 149. According to one embodiment, the sine wave current reference generation circuit 148 is an OP-AMP based circuit 148; however, in other embodiments, a different sine wave current reference generation circuit may be used. The PWM current controller 126 receives the reference signal 149 from the sine wave current reference generation circuit 148 and operates the converter 100 (via the switch 116) to provide desired output power based on the reference signal. In addition, also based on the reference signal, the PWM current controller 126 operates the regenerative snubber 128 to recover energy in the primary winding 112 (i.e. turn on the snubber) only while switch 116 is open. Control of the converter 100 will be discussed in greater detail below.

Figure 2:
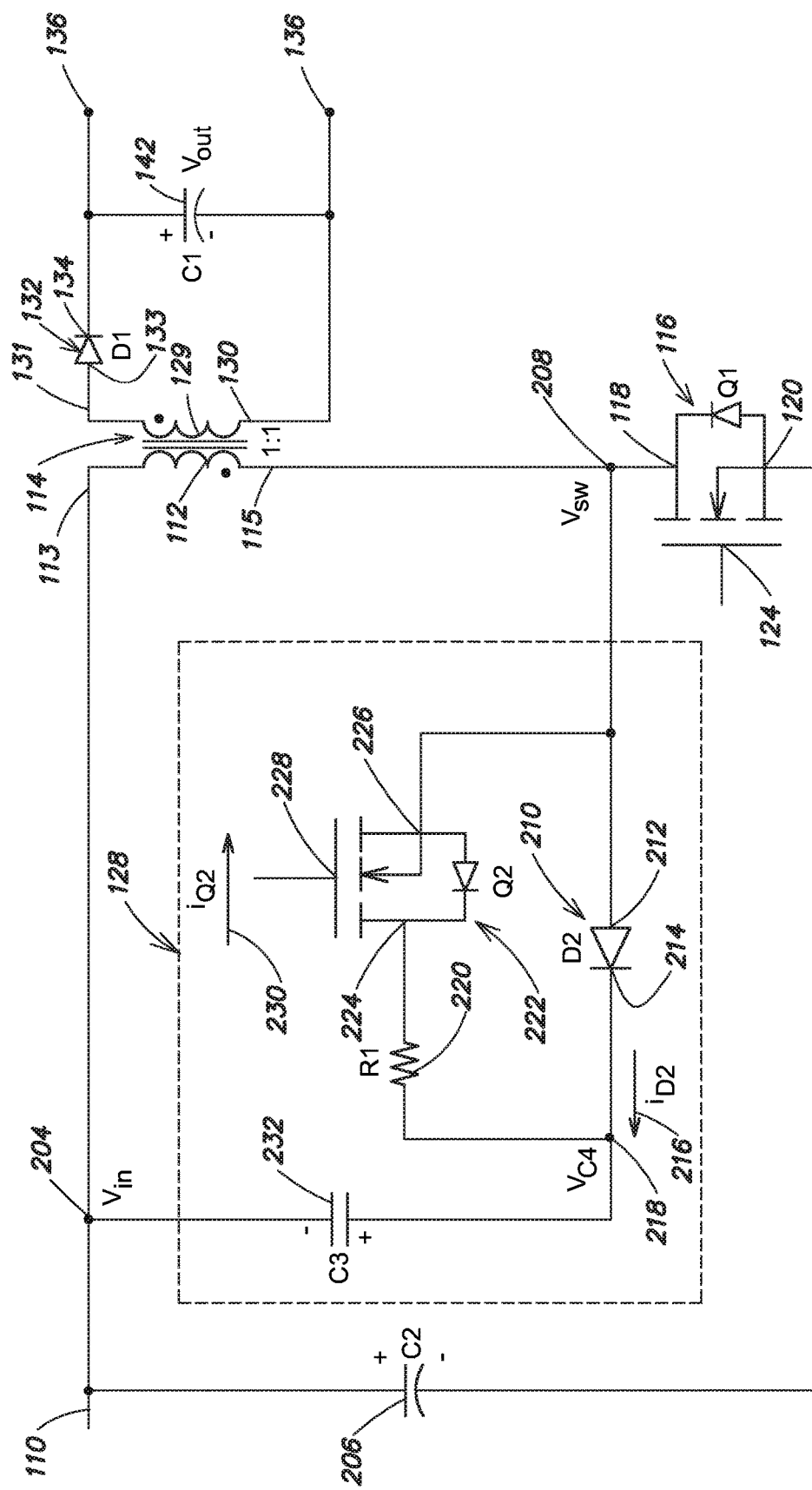
FIG. 2 is a schematic diagram of a regenerative snubber according to aspects of the current invention.

FIG. 2 is a schematic diagram of the regenerative snubber 128 circuit according to aspects of the current invention. The snubber circuit 128 includes a snubber diode 210, a switch 222, a node $V_{SW}$ 208, a node $V_{C4}$ 218, a snubber resistor 220, a snubber capacitor 232, and a node $V_{in}$ 204. According to one embodiment, the switch 222 is a Field-Effect Transistor (FET); however, in other embodiments, a different type of switch may be utilized.

The anode 212 of the snubber diode 210 is coupled to the drain 118 of the MOSFET 116 at node $V_{SW}$ 208 and to the source 226 of the FET 222. The cathode 214 of the snubber diode 210 is coupled to node $V_{C4}$ 218. The snubber resistor 220 is coupled between node $V_{C4}$ 218 and the drain 224 of FET 222. In one embodiment, the snubber capacitor 232 is coupled between node $V_{in}$ 204 and node $V_{C4}$ 218. In an alternative embodiment, the snubber capacitor 232 is connected between the nodes $V_{C4}$ 218 and ground 122. In another alternative embodiment, the regenerative snubber circuit 128 includes two snubber capacitors 232; one coupled between nodes $V_{in}$ 204 and node $V_{C4}$ 218, and the other between nodes $V_{C4}$ 218 and ground 122. Node $V_{in}$ 204 is coupled to the output 110 of the filter 108 and to the first end 113 of the primary winding 112 of the transformer 114. Another capacitor 206 is coupled between the output 110 of the filter 108 and ground 122.

Figure 3:
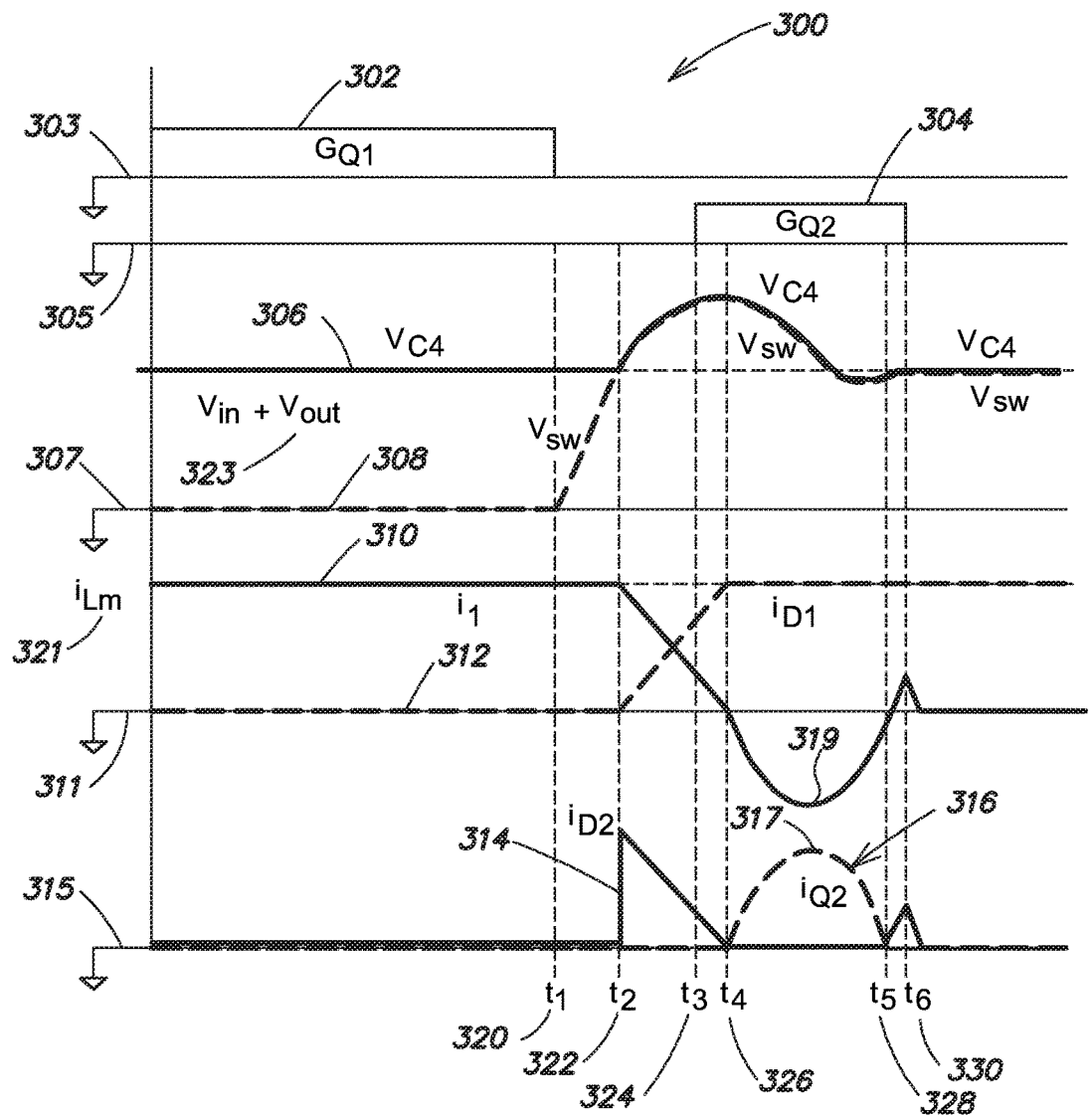
FIG. 3 is a timing diagram of a single-switch flyback converter according to aspects of the current invention.

Operation of the flyback converter 100 and the regenerative snubber 128 is discussed below with regards to the timing diagram 300 of FIG. 3. Trace 302 represents the gate 124 drive signal of MOSFET 116 in relation to zero level 303. Trace 304 represents the gate 228 drive signal of FET 222 in relation to zero level 305. Trace 306 represents the voltage at node $V_{C4}$ 218 in relation to zero level 307. Trace 308 represents the voltage at node $V_{SW}$ 208 in relation to zero level 307. Trace 310 represents the current ($i_1$) through the primary winding 112 of the transformer 114 in relation to zero level 311. Trace 312 represents the current ($i_{D1}$) through diode 132 in relation to zero level 311. Trace 314 represents the current ($i_{D2}$) through snubber diode 210 in relation to zero level 315. Trace 316 represents the current ($i_{Q2}$) through FET 222 in relation to zero level 315.

Prior to time $t_1$ 320, the MOSFET 116 in the flyback converter 100 is closed (i.e. the gate 124 driver signal is high) and power from the input mains 102 is rectified, filtered, and applied to the primary winding 112 of the transformer 114. The current ($i_1$) and magnetic flux in the primary winding 112 goes to $i_{LM}$ and energy is consequently stored in the transformer 114. Due to the opposite polarities of the primary and secondary windings 112, 129, the resulting voltage induced in the secondary winding 129 of the transformer 114 is negative. As a result, the diode 132 is reverse-biased, preventing current through the diode 132. The output capacitor 142 supplies previously stored energy to an output load. Also prior to time $t_1$ 320, the voltage 306 at node $V_{C4}$ 218 goes to a level equal to the sum 323 of the voltages at node $V_{in}$ 204 ($V_{in}$) and the output 136 ($V_{out}$).

At time $t_1$ 320, the MOSFET 116 in the flyback converter is opened (i.e. the gate drive 302 is pulled low) and the switch voltage $V_{SW}$ 308 rises from zero 307. At time $t_2$ 322, once the switch voltage $V_{sw}$ 308 equals $V_{in}+V_{out}$ (i.e. the voltage at node $V_{C4}$ 218), the output diode 132 is forward biased allowing current flow from the secondary winding 129 to the output 136 and the output capacitor 142 through the output diode 132. Also at time $t_2$ 322, the snubber diode 210 is forward biased, allowing any current associated with the leakage inductance of the primary winding 112 to pass from $V_{sw}$ 308 to the snubber capacitor 232 via the snubber diode 210. As can be seen in FIG. 3, when the snubber diode 210 is initially forward biased, leakage current ($i_{D2}$) through the snubber diode 210 spikes to a peak level.

Between times $t_2$ 322 and $t_4$ 326, current ($i_1$) 310 through the primary winding 112 goes to zero 311 from $i_{Lm}$ 321 (i.e. the magnetizing current) and current through the output diode 132 (from the secondary winding 129) increases to $i_{Lm}$ 321 from zero 311. Also between times $t_2$ 322 and $t_4$ 326, the snubber diode 210 conducts and leakage current ($i_{D2}$) 314 through the snubber diode 210 from the primary winding 112 charges the snubber capacitor 232.

From time $t_2$ 322 (when leakage current $i_{D2}$ is at its peak) to time $t_4$ 326, the leakage current ($i_{D2}$) 314 gradually goes to zero 315. As the snubber capacitor 232 charges, the voltage 306 at node $V_{C4}$ 218 (and also consequently switch voltage $V_{sw}$ 308) increases. However, as the leakage current ($i_{D2}$) 314 gradually goes to zero 315, the rate at which the voltage 306 at node $V_{C4}$ 218 (and also consequently switch voltage $V_{sw}$ 308) is increasing decreases from time $t_2$ 322 to time $t_4$ 326.

At time $t_3$ 324, the FET 222 within the snubber 128 is turned on while snubber diode 210 is conducting. As a result, according to one embodiment, the FET 222 turns on with Zero Voltage Switching (ZVS).

At time $t_4$ 326, the leakage current ($i_{D2}$) 314 reaches zero, the snubber diode 210 stops conducting, and the FET 222 starts conducting. The snubber capacitor 232 begins discharging and the voltage 306 at node $V_{C4}$ 218 (and also switch voltage $V_{sw}$ 308) begins to decrease. According to one embodiment, the discharge rate of the snubber capacitor 232 is controlled by a snubber resistor 220.

Also at time $t_4$ 326, current ($i_{Q2}$) 316 through the FET 222 begins to increase as the snubber capacitor 232 discharges through the FET 222. The current ($i_{Q2}$) 316 from the FET 222 passes through the primary winding 112 from the second end 115 to the first end 113 (shown in FIG. 3 as a negative primary winding current ($i_1$) 310). As the primary winding 112 and the secondary winding 129 have opposite polarities, the negative current ($i_1$) 310 in the primary winding 112 induces a positive current in the secondary winding 129 which is applied to the output 136.

Between times $t_4$ 326 and $t_5$ 328, the current ($i_{Q2}$) 316 through the FET 222 increases to a peak 317 and then subsequently decreases towards zero 315, the negative current ($i_1$) 310 through the primary winding 112 decreases to a corresponding negative peak 319 and then subsequently increases towards zero 311, and the voltage 306 at node $V_{C4}$ 218 (and also switch voltage $V_{sw}$ 308) decreases to a level equal to the sum 323 of the voltages at node $V_{in}$ 204 ($V_{in}$) and the output 136 ($V_{out}$).

At time $t_5$ 328, the snubber capacitor 232 completes discharging, the current ($i_{Q2}$) 316 through the FET is zero, the voltage 306 at node $V_{C4}$ 218 (and also switch voltage $V_{sw}$ 308) is equal to the sum 323 of the voltages at node $V_{in}$ 204 ($V_{in}$) and the output 136 ($V_{out}$), and the snubber diode 210 again begins to conduct.

According to one embodiment, at time $t_6$ 330, the FET 222 turns off with ZVS as the snubber diode 210 is conducting current. Upon the FET 222 turning off, the MOSFET 116 in the flyback converter may again be closed (i.e. the gate drive 302 is driven high).

Accordingly, the snubber 128 recovers energy associated with leakage inductance current in the primary winding 112 and a portion of the magnetizing energy in the primary winding 112, and feeds the energy back to the load to improve efficiency of the converter 100.

As discussed above, the PWM current controller 126 operates the converter 100 (via the switch 116) to provide desired output power based on the reference signal. In addition, also based on the reference signal, the PWM current controller 126 operates the regenerative snubber 128 to recover energy in the primary winding 112 (i.e. turn on the snubber) only while switch 116 (e.g., MOSFET 116) is open.

Figure 4:
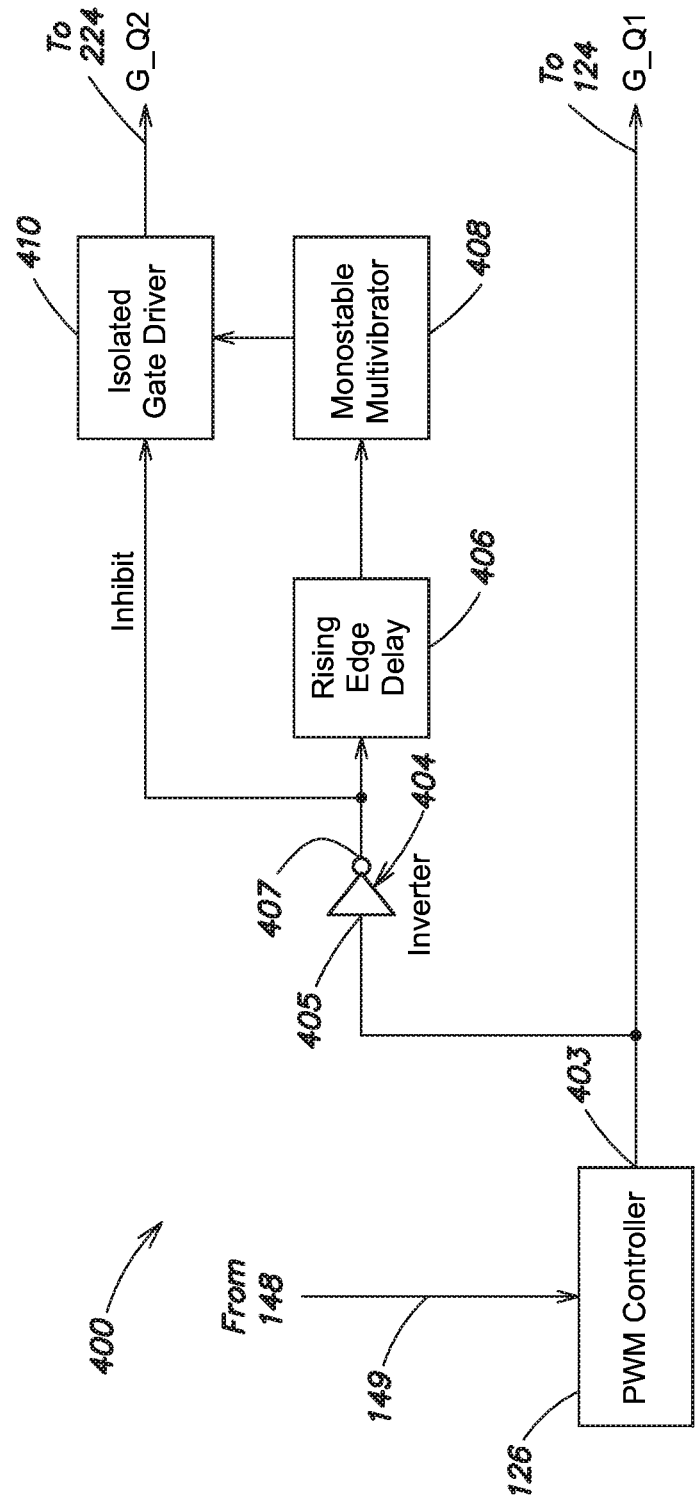
FIG. 4 is a block diagram of control circuitry of a flyback converter according to aspects of the current invention.

Control of the converter 100 will now discussed in relation to FIG. 4, which illustrates a portion 400 of the converter control circuitry 150 of the flyback converter 100. According to one embodiment, the portion 400 of the converter control circuitry 150 includes an op-amp based PFC controller. As seen in FIG. 4, the portion 400 of the converter control circuitry 150 includes the PWM current controller 126, an inverter 404, a rising edge delay circuit 406, a monostable multivibrator 408 and an isolated gate driver 410.

The PWM current controller 126 is coupled to the sine wave current reference generation circuit 148. An output 403 of the PWM current controller 126 is coupled to the gate 124 of the MOSFET 116. The output 403 of the PWM current controller 126 is also coupled to an input 405 of the inverter 404. An output 407 of the inverter 404 is coupled to the rising edge delay 406. The monostable multivibrator 408 is coupled between the rising edge delay 406 and the isolated gate driver 410. The isolated gate driver 410 is also coupled between the output 407 of the inverter 404 and the gate 224 of the FET 222

As seen in FIG. 1, the sine wave current reference generation circuit 148 derives the desired sine wave reference current signal 149 from the measured input voltage 145 and the output signal of the charger voltage and output current controller 144 (through the optocoupler 146). According to one embodiment, the sine wave reference generation circuit 148 derives the desired sine wave reference current signal 149 by multiplying the measured input voltage 145 with the output signal 143 of the charger voltage and current controller 144. For example, in one embodiment, the sine wave reference generation circuit 148 includes a multiplier which is implemented using sine-triangle comparison by a comparator.

The current reference signal 149 from the sine wave current reference generation circuit 148 is fed to the PWM current controller 126. According to one embodiment the PWM current controller 126 implements peak current mode control. For example, in one embodiment, the PWM current controller 126 includes a UC3842 peak current mode PWM controller, manufactured by Texas Instruments of Dallas, Tex. In another embodiment, the PWM current controller 126 implements average current mode control. For example, in one embodiment, the PWM current controller 126 includes a UC3845 average current mode PWM controller, manufactured by Texas Instruments of Dallas, Tex.

The PWM current controller 126 sends control signals to the gate 124 of the MOSFET 116 to control the MOSFET 116 (i.e. to drive the gate 124 high or low) based on the current reference signal 149. The PWM current controller 126 also controls the FET 222 by sending signals to the gate 228 of the FET 222 (i.e. driving the gate 228 high or low). As discussed above, the PWM current controller 126 operates to insure that the MOSFET 116 and the FET 222 are not on at the same time (i.e. the gates are not driven high at the same time).

For example, in one embodiment, the maximum duty cycle for the MOSFET 116 is limited by the PWM current controller 126 to a level where the device remains off for a minimum period of time. According to one embodiment, the minimum period of time is of 2.5-3 µs; however, in other embodiments the minimum period of time may be defined differently. During the time in which the MOSFET 116 is off (i.e. the control signal from the PWM current controller 126 to the gate 124 of the MOSFET 116 is low), the low signal to the gate 124 of the MOSFET 116 is inverted to a high signal by the inverter 404. The rising edge delay circuit 406 senses the rising edge of the inverted high signal and provides a delay in the high signal to insure separation between when the MOSFET 116 is turned off and the FET 222 is turned on. According to one embodiment, the delay introduced by the rising edge delay 406 is 0.5 µs; however, in other embodiments, the delay may be defined differently.

Upon receiving the inverted high signal, the monostable multivibrator 408 and the isolated gate driver 410 operate to provide the desired pulse to the gate 228 of the FET 222. Once the gate control pulse signal to the FET 222 goes low, the MOSFET 116 may again be turned on (i.e. the gate signal to the MOSFET 116 can again be driven high).

Figure 5:
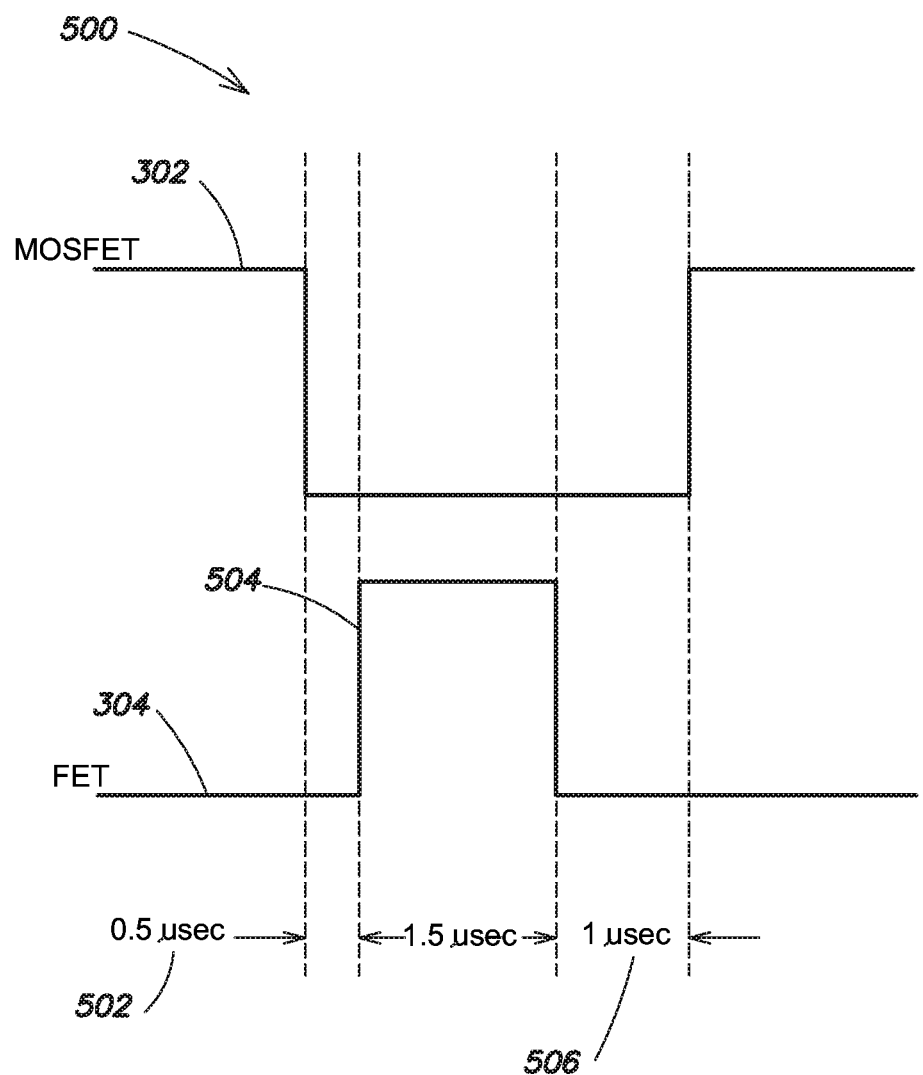
FIG. 5 is a gating pulse timing diagram of a flyback converter according to aspects of the current invention.

An example gating pulse timing diagram 500 can be seen in FIG. 5. Trace 302 represents the gate 124 driver signal of the MOSFET 116. Trace 304 represents the gate 228 driver signal of the FET 222. Once the gate 124 driver signal 302 of the MOSFET 116 is driven low, the low signal is inverted by the inverter 404 and the resulting high signal is delayed by the rising edge delay circuit 406. According to one embodiment, the delay 502 is 0.5 µs.

After the delay 502, the monostable multivibrator 408 and the isolated gate driver 410 generate the desired pulse 504 in the gate 228 driver signal 304. According to one embodiment, the pulse 504 is 1.5 µs long; however, in other embodiments, the pulse 504 may be configured differently. The FET 222 is turned on (i.e. the snubber circuit 128 recovers leakage energy and feeds it back to the load) over the length of the pulse 504.

At the end of the pulse 504, the gate 228 driver signal 304 is driven low and the FET 222 is turned off. At this time, the gate 124 driver signal 302 of the MOSFET 116 may again be driven high to turn on the MOSFET 116. According to one embodiment, the MOSFET 116 is turned on after a delay 506 to ensure separation between when the MOSFET 116 is turned on and the FET 222 is turned off. According to one embodiment, the delay 506 is 1 µs.

By preventing the regenerative snubber circuit 128 from being turned on at the same time the switch 116 is closed, the regenerative snubber circuit 128 may be prevented from interfering with operation of the converter 100 in the first mode of operation.

The converter control circuitry 150 in accordance with one embodiment will now be discussed in greater detail below with reference to the circuit diagram of FIG. 6. As discussed above, the converter control circuitry 150 is coupled to, and configured to control, the flyback converter 100. The regenerative snubber 128 of the flyback converter 100, described above with reference to FIGS. 1-2, is not shown in FIG. 6 to simplify the diagram of FIG. 6.

The converter control circuitry 150 includes the PWM current controller 126 and the sine wave current reference generation circuit 148. According to one embodiment, the PWM current controller 126 is a UC3842 peak current mode PWM controller, manufactured by Texas Instruments of Dallas, Tex., that includes a $V_{REF}$ pin 632, an output pin 634, a ground pin 636, a COMP pin 638, a current sense pin 640, and an $R_T/C_T$ pin 642. According to one embodiment, the sine wave current reference generation circuit 148 includes the input line 145, a comparator based pulse generator 610, a monostable multivibrator 612, a carrier generator 614, and a multiplier 616. In one embodiment, the multiplier 616 includes a comparator 618, a first resistor 620, a second resistor 622, a capacitor 624, and a buffer transistor 626.

The input line 145 of the sine wave current reference generation circuit 148 is coupled to the output 110 of the filter 108 via a plurality of resistors 604, 606. In one embodiment, the input line 145 is also coupled to a ground connection 609 via a resistor 608. The non-inverting terminal 617 of the comparator 618 in the multiplier 616 is coupled to the input line 145. The non-inverting terminal 617 of the comparator 618 is also coupled to a reference voltage 628 (e.g. +5V) via an offset line 630. According to one embodiment, the reference voltage 628 is supplied by the $V_{REF}$ pin 632 of the PWM current controller 126.

The comparator based pulse generator 610 is coupled to the $R_T/C_T$ pin 642 of the PWM current controller 126 and to the monostable multivibrator 612. The monostable multivibrator 612 is coupled to the carrier generator 614. The carrier generator 614 is coupled to the inverting terminal 619 of the comparator 618 in the multiplier 616. The carrier generator 614 is also coupled to the current sense pin 640 of the PWM current controller 126 via a resistor 641. The current sense pin 640 is also coupled to the source 120 of the MOSFET 116.

The output 623 of the comparator 618 is coupled to the optocoupler 146 via a first resistor 620. The output 623 of the comparator 618 is also coupled to the base 627 of the buffer transistor 626 via an RC filter including the second resistor 622 and the capacitor 624. The emitter 629 of the buffer transistor 626 is coupled to the COMP pin 638 of the PWM current controller 126. The output pin 634 of the PWM current controller 126 is coupled to the gate 124 of the MOSFET 116.

The optocoupler 146 is coupled to the voltage and current controller 144 via resistors 602. According to one embodiment, the voltage and current controller 144 includes a voltage controller 644, a current controller 646, and a current sensor 650 (e.g., a resistor). The voltage controller 644 includes a comparator or op-amp coupled to the output 136 of the converter 100 and to a reference voltage signal 645. The current controller 646 includes a comparator or op-amp coupled to the output 136 of the converter 100 and to a reference current signal 647.

As described above, based on the current reference signal 149 from the current reference generation circuit 148, the PWM current controller 126 sends control signals to the gate 124 of the MOSFET 116 and to the gate 228 of the FET 222. The sine wave current reference generation circuit 148 derives the desired sine wave reference current signal 149 from the measured input voltage (signal A) 145 at the output of the filter 108 and the output signal 143 of the charger voltage and current controller 144 (through the optocoupler 146).

The current reference signal 149 is provided to the UC3842 peak current mode PWM controller 126 and the PWM controller 126 operates the converter 100 based on the reference signal 149. By implementing peak current mode control of the converter 100, the PWM controller 126 provides enhanced current loop stability when the flyback converter 100 is operating under Continuous Conduction Mode (CCM). With this scheme, to avoid potential input current distortion, the duty cycle of the main MOSFET 116 can be modulated almost continuously along the line cycle.

In one embodiment, to avoid the need to continuously modulate the main MOSFET 116, the sine wave reference generation circuit 148 derives the desired sine wave reference current signal 149 by multiplying the measured input voltage 145 with the output signal 143 of the charger voltage and current controller 144.

Figure 6:
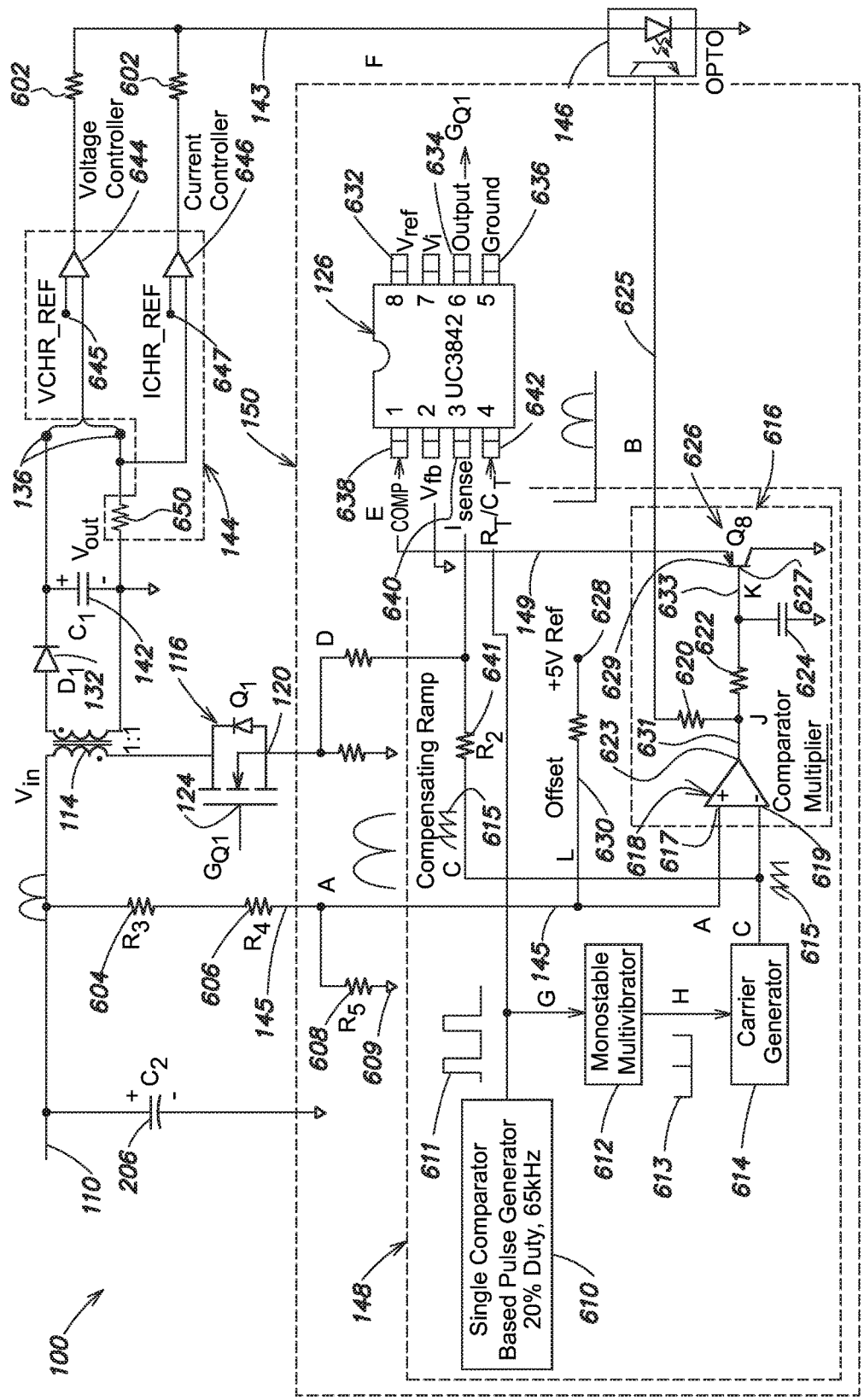
FIG. 6 is a circuit diagram of control circuitry of a flyback converter according to aspects of the current invention.

For example, as seen in FIG. 6, the pulse generator 610 generates a pulse signal 611 that drives the PWM current controller 126 via the $R_T/C_T$ pin 642. According to one embodiment, the comparator based pulse generator 610 is an LM339 single comparator based external pulse generator, manufactured by Texas Instruments of Dallas, Tex.; however, in other embodiments, a different pulse generator may be used. In one embodiment, the pulse signal 611 has a frequency of 65 kHz and a duty cycle of 20%; however, in other embodiments, the pulse signal 611 may be configured differently.

The pulse signal 611 (signal G) generated by the pulse generator 610 is also provided to the monostable multivibrator 612 to generate a narrow pulse (signal H). According to one embodiment, the monostable multivibrator 612 is a CD4098 CMOS dual monostable multivibrator, manufactured by Texas Instruments of Dallas, Tex.; however, in other embodiments, a different monostable multivibrator may be used.

The narrow pulse 613 is provided to the carrier generator 614 to generate a triangular shaped carrier (signal C) 615. The carrier signal 615 is fed to the current sense pin 640 as the compensating ramp for slope compensation. In one embodiment, the strength of the carrier C is varied through the value of the resistor 641.

As discussed above, in one embodiment the multiplier 616 is implemented using sine-triangle comparison with the comparator 618. The comparator 618 compares the input sine wave (signal A) 145 with the carrier signal (signal C) 615. The output of the comparator 618 (signal J) is a sine-modulated PWM signal.

The signal B 625 from the optocoupler 146 determines the pull-up voltage for the comparator 618. The signal B 625 is generated from the output (signal F) 143 of the voltage and current controller 144. The voltage controller 644 compares the voltage at the output 136 of the converter 100 with a reference voltage 645 and the current controller 646 compares the output current of the converter 100 (measured through the current sensor 650) with a reference current 647. Based on these comparisons, the voltage and current controller 144 generates the output signal 143. Based on the output signal 143 from the voltage and current controller 144, the optocoupler 146 provides signal B 625 to the output 623 of the comparator 618.

The sine-modulated output PWM signal of the comparator 618 (signal J) is filtered via the RC filter (including resistor 622 and capacitor 624) to obtain a filtered signal K 633 which is provided to the base 627 of the buffer transistor 626. The current reference signal 149 (signal E), based on the filtered signal K 633, is provided from the emitter 629 of the buffer transistor 626 to the COMP pin 638 of the UC3842 peak current mode PWM controller 126. Based on the current reference signal 149 at the COMP pin 638, the PWM current controller 126 sends control signals to the gate 124 of the MOSFET 116 via the output pin 634 to control operation of the converter 100.

In addition, as discussed above with regards to FIG. 4, based on the signals provided to the gate 124 of the MOSFET 116, the FET 222 (of the regenerative snubber circuit 128) is also controlled to avoid interfering with operation of the converter 100 in the first mode of operation. For example, in one embodiment, the regenerative snubber 128 is prevented from being turned on at the same time the switch 116 is closed.

According to one embodiment as described above, the converter control circuitry 150 is a low-cost op-amp based PFC controller that derives the desired sine wave peak current reference signal from the measured input voltage and the output signal of the voltage and/or current controller. The peak current reference signal is fed to the peak current mode PWM controller (e.g., the UC3842). According to one embodiment, the peak current mode PWM controller offers improved current loop stability for the converter while operating under CCM. For example, in one embodiment, the configuration of the converter control circuitry 150 described above improves the input power factor of the converter and brings the input current Total Harmonic Distortion (THD) down to less than 4%.

Additionally, in one embodiment where the peak current mode PWM controller is a UC3842 peak current mode PWM controller, the configuration of the converter control circuitry 150 described above is utilized in an AC-DC application despite the UC3842 peak current mode PWM controller being generally designed for DC-DC applications.

As described above, the PWM current controller 126 is a UC3842 peak current mode PWM controller; however, in other embodiments, the converter 100 may include another type of controller (e.g., a different type of peak current mode controller or an average current mode controller).

As also described above, the sine wave current reference signal 149 is generated by the sine wave current reference generation circuit 148; however, in other embodiments, the sine wave current reference signal 149 is generated using a digital controller such as a Digital Signal Processor (DSP), Field-Programmable Gate Array (FPGA), microcontroller, or any other type of digital controller.

As described herein, the regenerative snubber circuit 128 is utilized in an AC-DC flyback converter 100; however, in other embodiments, the regenerative snubber 128 may be used with a DC-DC flyback converter.

As described herein, the regenerative snubber circuit 128 is utilized in an AC-DC converter based battery charger; however, in other embodiments, the regenerative snubber circuit 128 is utilized in any other type of flyback converter.

At least some embodiments described herein provide a single-switch flyback converter with a regenerative snubber circuit. The regenerative snubber circuit recovers energy associated with leakage inductance current in the primary winding that may otherwise be wasted. The recovered energy is fed back to the load to improve efficiency of the converter.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A flyback converter, the flyback converter comprising:
   an input to receive input AC power;
   an output to provide output DC power;
   a rectifier coupled to the input and configured to convert the input AC power into DC power;
   a transformer having a primary winding and a secondary winding, the primary winding having a first end coupled to the rectifier;
   a switch coupled between a second end of the primary winding and a ground connection, the switch being closed in a first mode of operation and open in a second and third mode of operation; and
   a regenerative snubber circuit coupled between the first end of the primary winding and the second end of the primary winding, the regenerative snubber circuit comprising:
      a snubber capacitor coupled to the first end of the primary winding;
      a series connection of a snubber resistor and a snubber switch coupled between the snubber capacitor and the second end of the primary winding; and
      a snubber diode, coupled in parallel with the series connection of the snubber resistor and the snubber switch, and coupled between the snubber capacitor and the second end of the primary winding,
   wherein the flyback converter is configured such that in the first mode of operation, the DC power from the rectifier charges the transformer,
   wherein the flyback converter is configured such that, in the second mode of operation, the snubber capacitor stores leakage energy received from the primary winding through the snubber diode, and
   wherein the flyback converter is configured such that, in the third mode of operation, the snubber capacitor provides the stored leakage energy to the primary winding through the series connection of the snubber resistor and the snubber switch.

2. The flyback converter of claim 1, wherein the switch is a MOSFET having a drain coupled to the second end of the primary winding and a source coupled to the ground connection.

3. The flyback converter of claim 1, wherein the primary winding and the secondary winding have opposite polarities.

4. The flyback converter of claim 3, further comprising:
   an output diode coupled between the secondary winding and the output; and
   an output capacitor coupled to the output and configured to be coupled to a load,
   wherein the flyback converter is configured such that, in the second mode of operation, the secondary winding provides the output DC power to the output capacitor and to the output via the output diode, and
   wherein the flyback converter is configured such that, in the first mode of operation, the output capacitor provides the output DC power to the output.

5. The flyback converter of claim 4, further comprising a filter coupled between the rectifier and the first end of the primary winding.

6. The flyback converter of claim 1, wherein the snubber switch is a FET having a drain coupled to the snubber capacitor and a source coupled to the second end of the primary winding.

7. The flyback converter of claim 1, further comprising a controller coupled to the switch and to the regenerative snubber circuit, the controller configured to operate the switch to provide desired DC power and to operate the regenerative snubber circuit to recover leakage energy from the primary winding while the switch is open.

8. The flyback converter of claim 7, further comprising a reference current generation circuit coupled to the output and to the primary winding, the reference current generation circuit configured to generate a reference current signal based on the output DC power and the DC power from the rectifier,
   wherein the controller is further configured to operate the switch and the regenerative snubber circuit based on the reference current signal.

9. The flyback converter of claim 8, wherein the controller is configured to implement peak current mode control based on the reference current signal.

10. The flyback converter of claim 9, wherein the reference current generation circuit includes a multiplier, and wherein the reference current generation circuit is further configured to generate the reference current signal by multiplying a signal related to a voltage at the first end of the primary winding with a signal related to a voltage at the output.

11. The flyback converter of claim 10, wherein the multiplier is implemented using sine-triangle comparison by a comparator.

12. A method for operating a flyback converter, the method comprising:
    receiving input AC power at an input of the flyback converter;
    providing output DC power to an output of the flyback converter;
    converting the input AC power into DC power;
    in a first mode of operation of the flyback converter, charging a transformer with the DC power;
    in a second mode of operation of the flyback converter, discharging the transformer to provide the output DC power to the output, and storing, with a snubber capacitor in a regenerative snubber circuit, leakage energy received from the transformer through a snubber diode; and
    in a third mode of operation of the flyback converter, providing, by the snubber capacitor, previously stored leakage energy to the transformer through a series connection of a snubber resistor and a snubber switch coupled in parallel with the snubber diode.

13. The method of claim 12, further comprising:
    in the first mode of operation, discharging an output capacitor to provide the output DC power to the output; and
    in the second mode of operation, charging the output capacitor with energy from the transformer.

14. The method of claim 12, wherein providing stored leakage energy includes:
    coupling the snubber capacitor to the transformer; and
    discharging the snubber capacitor to provide stored leakage energy to the transformer.

15. The method of claim 12, further comprising:
    sensing that the flyback converter is no longer in the first mode of operation; and
    controlling the flyback converter to enter the second mode of operation after a predetermined delay.

16. A flyback converter, the flyback converter comprising:
    an input to receive input AC power;
    an output to provide output DC power and configured to be coupled to a load;
    a rectifier coupled to the input and configured to convert the input AC power into DC power;

a transformer having a primary winding and a secondary winding, the primary winding having a first end coupled to the rectifier;

a switch coupled between a second end of the primary winding and a ground connection, the switch being closed in a first mode of operation and open in a second and third mode of operation; and means for recovering, in the second mode of operation, leakage energy received from the primary winding of the transformer through a charging path and providing, in the third mode of operation, the recovered leakage energy to the load through a discharging path including a resistive element configured to control a rate at which the recovered leakage energy is provided to the load.

17. The flyback converter of claim 16, further comprising means for preventing the means for recovering leakage energy from interfering with operation of the flyback converter in the first mode of operation.

\* \* \* \* \*